(12) United States Patent
Takeishi

(10) Patent No.: US 8,705,051 B2
(45) Date of Patent: Apr. 22, 2014

(54) IMAGE FORMING APPARATUS, METHOD AND MEDIUM FOR DETECTING BLANK PAGES

(75) Inventor: Hiroki Takeishi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1128 days.

(21) Appl. No.: 12/201,049

(22) Filed: Aug. 29, 2008

(65) Prior Publication Data

US 2009/0066979 A1 Mar. 12, 2009

(30) Foreign Application Priority Data

Sep. 7, 2007 (JP) ................................. 2007-233382

(51) Int. Cl.
*G06F 3/12* (2006.01)

(52) U.S. Cl.
USPC .......... 358/1.1; 358/1.13; 358/1.18; 382/239; 382/199

(58) Field of Classification Search
None
See application file for complete search history.

(56) References Cited

U.S. PATENT DOCUMENTS

| 5,548,664 | A  | * | 8/1996  | Knowlton ..................... 382/174 |
| 6,209,987 | B1 | * | 4/2001  | Katayama ....................... 347/43 |
| 7,359,083 | B2 | * | 4/2008  | Salgado ....................... 358/1.18 |
| 2003/0161002 | A1 | | 8/2003 | Nishiwaki et al. ........... 358/1.15 |
| 2005/0200903 | A1 | * | 9/2005 | Okubo ........................ 358/3.24 |
| 2006/0023236 | A1 | * | 2/2006 | Sievert et al. ................ 358/1.12 |
| 2006/0044590 | A1 | * | 3/2006 | Ferlitsch et al. ............. 358/1.14 |
| 2006/0290948 | A1 | * | 12/2006 | Ferlitsch ....................... 358/1.1 |

FOREIGN PATENT DOCUMENTS

| JP | 2002-120411 | 4/2002 |
| JP | 2004-147193 | 5/2004 |
| JP | 2004-227530 | 8/2004 |

* cited by examiner

*Primary Examiner* — David S Cammack
(74) *Attorney, Agent, or Firm* — Fitzpatrick, Cella, Harper & Scinto

(57) ABSTRACT

An image forming apparatus for generating image data of a page divided into small areas continuously in a predetermined direction and forming an image based on the image data, includes a detection unit configured to detect a continuous range of the image data having the same image contents in the page, the page including at least one continuous range, a specifying unit configured to specify image data of interest in the continuous range of the image data detected by the detection unit, and a first determination unit configured to determine based on the image data of interest whether the page is a blank sheet.

9 Claims, 11 Drawing Sheets

IMAGE FORMING APPARATUS, METHOD AND MEDIUM FOR DETECTING BLANK PAGES

BACKGROUND OF THE INVENTION

1. Field of the Invention

The present invention relates to an image forming apparatus for forming a visible image, an image forming method and a medium.

2. Description of the Related Art

Some widely used image forming apparatuses determine in every image forming process whether an image corresponds to a blank sheet or not or whether an image is color or monochrome, and manage the total output number of color images and that of monochrome images. A sum based on a determination result in such an image forming apparatus is used for output management, output limitation, running cost grasping, maintenance, charging management, and the like.

An image forming apparatus receives PDL data (page description data), interprets it, and generates image data for image formation. The image data is sometimes divided into, for example, tile-shaped small areas and sequentially generated together with additional information. Each of the generated image data of the divided small areas is sequentially processed, compressed, and stored in a memory based on the additional information. Since the image data is compressed before it is stored in the memory, the memory capacity can be saved. Generally, the additional information easily includes, for example, information representing whether one of the sequentially generated image data of the divided small areas has the same contents as those of immediately precedingly generated image data. When image data necessary for image formation of a full page are written in the memory, the image forming apparatus forms an image using these image data.

Conventionally, after scanning the color information of image data of a small area or full page that is an image formation target, it is determined whether the color information contains a color component, thereby determining whether the result of visible image formation is a blank sheet. Japanese Patent Laid-Open No. 2002-120411 describes a technique of executing a blank sheet detection process for only K component image data, compressing the K component image, and comparing the data size of the compressed K component image with that of compressed YMC component image data, thereby performing blank sheet determination of a color image at a high speed. Japanese Patent Laid-Open No. 2004-227530 describes a technique of compressing image data of an output target, and comparing the compressed data with blank image data prepared in advance, thereby executing blank sheet determination. Japanese Patent Laid-Open No. 2004-147193 describes an image processing apparatus capable of executing blank sheet determination of a document using an existing compression/decompression means without adding a new functional circuit. According to Japanese Patent Laid-Open No. 2004-147193, since unnecessary image data determined as a blank sheet document is erased from a storage medium such as a memory, the area of the storage medium is effectively usable.

However, in determining whether the result of visible image formation is a blank sheet, if the color information of all the sequentially generated image data is scanned by software processing, as in the prior art, the process time increases. To scan the color information of image data, uncompressed image data needs to be prepared. This requires a larger memory capacity. In the conventional techniques, whether an image formation result is a blank sheet is determined on the basis of the interpretation result of a PDL data (page description data) interpretation module implemented by software. However, since the determination is done using PDL data without solving depth information (Z direction), a determination error may occur. If blank sheet determination is done by hardware to solve the problem, the cost of the image forming apparatus rises due to the added hardware. The method of determining based on a compression rate whether image data is a blank sheet document may cause a determination error because a black sheet filled with black color information and a blank sheet filled with white color information have almost the same compression rate.

SUMMARY OF THE INVENTION

The present invention provides an image forming apparatus capable of executing blank sheet determination at a high speed.

The present invention in its first aspect provides an image forming apparatus for generating image data of a page divided into small areas continuously in a predetermined direction and forming an image based on the image data, comprising: a detection unit configured to detect a continuous range of the image data having the same image contents in the page, the page including at least one continuous range; a specifying unit configured to specify image data of interest in the continuous range of the image data detected by the detection unit; and a first determination unit configured to determine based on the image data of interest whether the page is a blank sheet.

The present invention in its second aspect provides an image forming method of generating image data of a page divided into small areas continuously in a predetermined direction and forming an image based on the image data, comprising: a detection step of detecting a continuous range of the image data having the same image contents in the page, the page including at least one continuous range; a specifying step of specifying image data of interest in the continuous range of the image data detected in the detection step; and a first determination step of determining based on the image data of interest whether the page is a blank sheet.

The present invention in its third aspect provides a computer-readable medium which stores an image forming program for generating image data of a page divided into small areas continuously in a predetermined direction and forming an image based on the image data, the image forming program causing a computer to function to: detect a continuous range of the image data having the same image contents in the page, the page including at least one continuous range; specify image data of interest in the detected continuous range of the image data; and determine based on the image data of interest whether the page is a blank sheet.

According to the present invention, an image forming apparatus for executing blank sheet determination can speed up the process.

Further features of the present invention will become apparent from the following description of exemplary embodiments with reference to the attached drawings.

DESCRIPTION OF THE EMBODIMENTS

Figure 1:
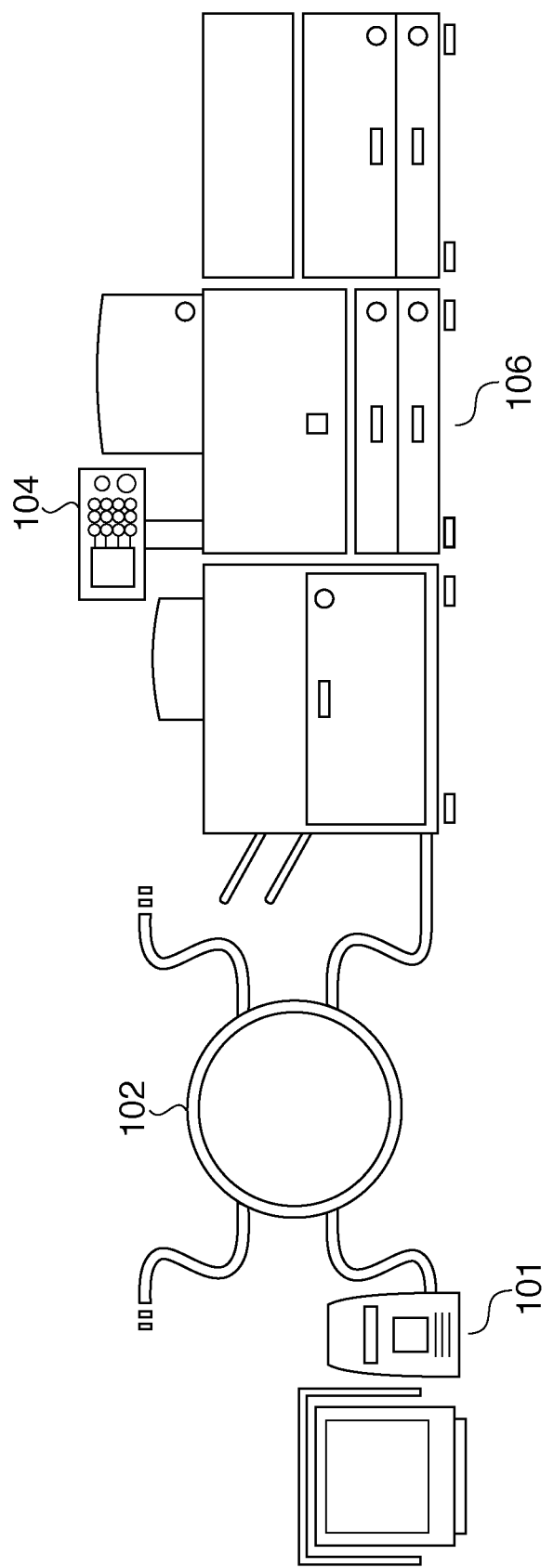
FIG. 1 is a view showing the arrangement of an image forming apparatus according to an embodiment of the present invention.

The best mode for carrying out the present invention will now be described with reference to the accompanying drawings. The same reference numerals denote the same constituent elements, and a description thereof will be omitted.

FIG. 1 is a view showing the arrangement of an image forming apparatus according to an embodiment of the present invention. FIG. 1 shows a laser beam printer as an example of the image forming apparatus. This arrangement is applicable to any other image forming apparatuses capable of forming a visible image, besides the laser beam printer. Examples are an inkjet printer, image setter, offset printing press, and their MFPs (Multi Function Peripherals).

A data processing apparatus 101 shown in FIG. 1 is a computer which functions as the supply source of image information to an image forming apparatus 106 or the control apparatus of the image forming apparatus 106. The data processing apparatus 101 may be, for example, a print server or thin client. The image forming apparatus 106 is, for example, a laser printer which is connected to the data processing apparatus 101 via a network 102. Data and instructions are communicated via the network 102.

In this embodiment, image information is data described in, for example, a page description language. Such data will also be referred to as PDL data hereinafter. The image forming apparatus 106 forms a visible image based on PDL data supplied via the network 102. The image forming process is executed using a controller 103, printer engine 105, and panel display operation unit 104 of the image forming apparatus 106 to be described later.

Figure 2:
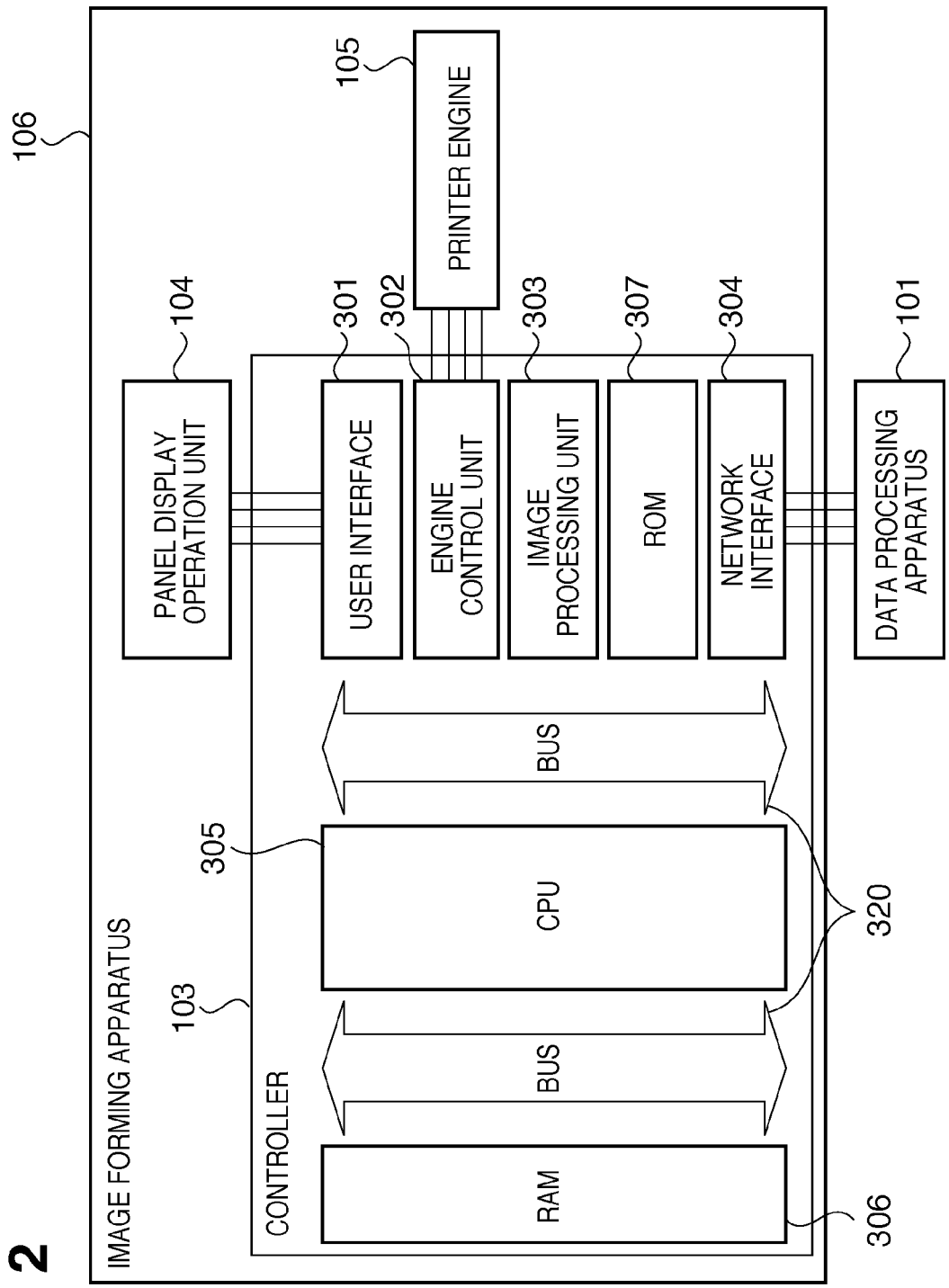
FIG. 2 is a block diagram showing the arrangement of the image forming apparatus shown in FIG. 1.

FIG. 2 is a block diagram showing the arrangement of the image forming apparatus 106 shown in FIG. 1. A bus 320 shown in FIG. 2 connects a CPU 305, RAM 306, user interface 301, engine control unit 302, image processing unit 303, ROM 307, and network interface 304. Data and instructions are mutually communicated on the bus 320. The ROM 307 is a nonvolatile memory which can hold data even if power supply to the controller 103 stops. Hence, the ROM 307 may store instructions to be executed by the CPU 305 upon powering on the controller 103 or image forming apparatus 106, or programs according to the embodiment.

The controller 103 generates image data of each page based on image information, that is, PDL data supplied from the data processing apparatus 101, and outputs the image data to the printer engine 105. The user can instruct the image forming apparatus 106 to do a desired operation by operating the panel display operation unit 104 serving as a user interface. The user can also recognize the operation of the image forming apparatus 106 based on process contents or warning contents displayed on the panel display operation unit 104.

The process of generating image data from PDL data will be described. The CPU 305 interprets PDL data supplied from the data processing apparatus 101, thereby generating image data. Generally, when PDL is interpreted, a display list (to be also referred to as DL hereinafter) as an intermediate language is generated. The DL is converted into image data. The process of converting DL to image data is known as rendering or RIP process. The PDL data supplied via the network interface 304 is temporarily stored in the RAM 306. The PDL data stored in the RAM 306 is interpreted by the CPU 305 to generate DL, and stored in the RAM 306 again. The process of causing the CPU 305 to interpret the PDL data is generally known as a PDL interpret process. The CPU 305 supplies the DL to the image processing unit 303 so that image data is generated under the control of the CPU 305. The generated image data is stored in the RAM 306 again.

A process of forming a visible image based on the generated image data on a medium such as a paper sheet will be described next. The CPU 305 supplies the image data stored in the RAM 306 to the engine control unit 302. The engine control unit 302 supplies a control instruction and the image data to the printer engine 105 to operate it by the control instruction. Based on the supplied control instruction and image data, the printer engine 105 forms a latent image on a photosensitive drum and transfers and fixes the latent image onto a printing medium such as a paper sheet, thereby forming a visible image.

Figure 3:
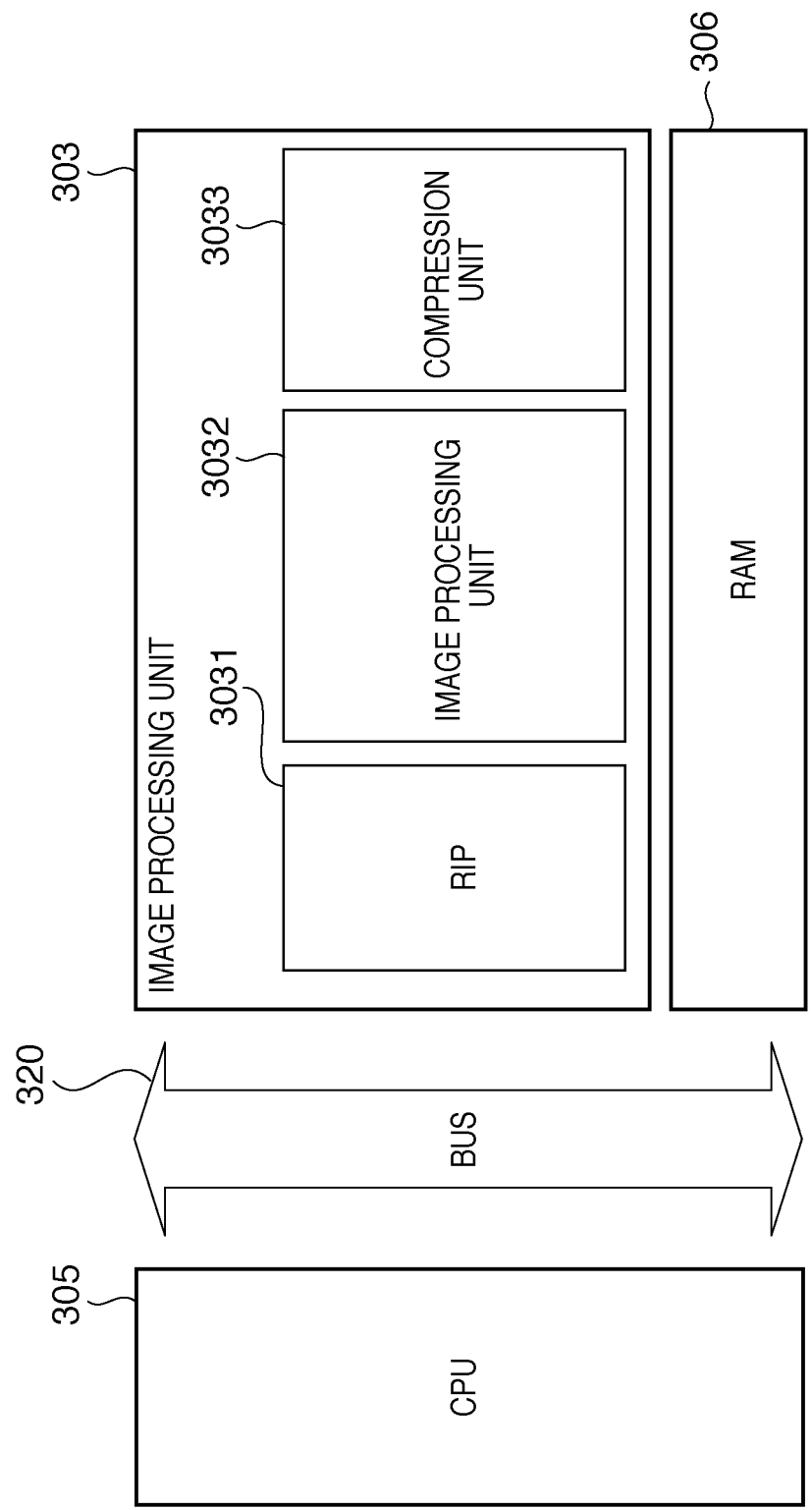
FIG. 3 is a block diagram showing the arrangement of modules included in an image processing unit shown in FIG. 2.

Image processing of the embodiment will be described below with reference to FIGS. 3 and 4. FIG. 3 is a block diagram showing the arrangement of modules included in the image processing unit 303 shown in FIG. 2. As shown in FIG. 3, the image processing unit 303 includes a RIP 3031, image processing unit 3032, and compression unit 3033. The CPU 305 shown in FIG. 3 is connected to the RAM 306, image processing unit 303, and the like via the bus 320. In this embodiment, for example, an image forming program for implementing the present invention is loaded from the ROM 307 to the RAM 306. The CPU 305 interprets and executes the loaded program. The CPU 305 interprets the image forming program and controls the modules shown in FIG. 3 via the bus 320. In this case, the image forming program may be recorded in another recording medium and executed.

A process of generating image data from DL will be described. The CPU 305 controls the RIP 3031, which executes a process while loading DL data to generate image data divided into small areas (to be also referred to as tile images hereinafter) and information (to be also referred to as additional information hereinafter) associated with the image data. Next, the CPU 305 controls the image processing unit 3032, which executes color processing and various determination processes for the tile images and additional information generated by the RIP 3031 and outputs the data to the compression unit 3033. The CPU 305 controls the compression unit 3033, which compresses the tile images and additional information supplied from the image processing unit 3032 and writes the data in the RAM 306. Then, the tile images are sequentially processed to generate image data. This allows forming a visible image on a printing medium such as a paper sheet.

Figure 4:
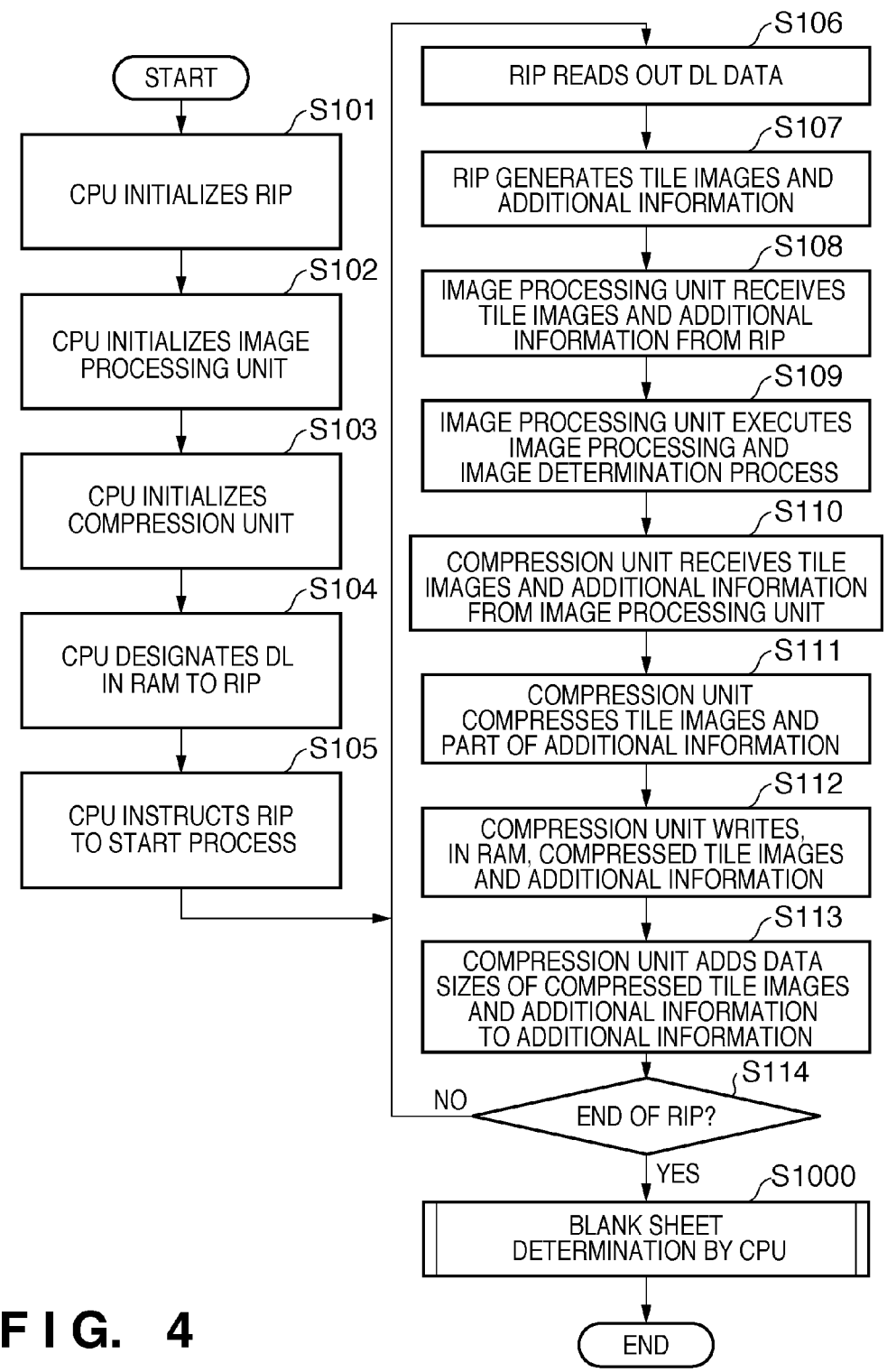
FIG. 4 is a flowchart illustrating the procedure of a process of generating image data from DL.

FIG. 4 is a flowchart illustrating the procedure of the process of generating image data from DL. The process of generating image data from DL will be referred to as a RIP process hereinafter.

In step S101, the CPU 305 initializes the RIP 3031 by, for example, executing a hardware initialization sequence. Consequently, the RIP 3031 acquires initial information such as a resolution in the RIP process and becomes ready to start the RIP process. In step S102, the CPU 305 initializes the image processing unit 3032 by, for example, executing a hardware initialization sequence. Consequently, the image processing unit 3032 acquires initial values in image processing and becomes ready to start the RIP process. In step S103, the CPU 305 initializes the compression unit 3033 by, for example, executing a hardware initialization sequence. Consequently, the compression unit 3033 acquires initial values in compression processing and becomes ready to start the RIP process.

In step S104, the CPU 305 designates, to the RIP 3031, DL data as a RIP process target. For example, the CPU 305 may designate, to the RIP 3031, the address value of DL as a RIP process target stored in the RAM 306. In step S105, the CPU 305 instructs the RIP 3031 to start the RIP process. In step S106, the RIP 3031 reads out the DL data from the RAM 306 and processes it. As a result, image data (tile images) divided into small areas and additional information are generated in step S107.

The additional information will be described. In this embodiment, additional information means information or flag data contained in PDL data. Information contained in PDL data means, for example, a flag (image attribute information) representing an object type such as character, image, or graphic in pixel information at an arbitrary position of image data. Flag data (to be also referred to as a repeat flag hereinafter) represents, for example, whether one of sequentially output divided image data has the same contents as those of the visible image of immediately precedingly generated image data.

Figure 5:
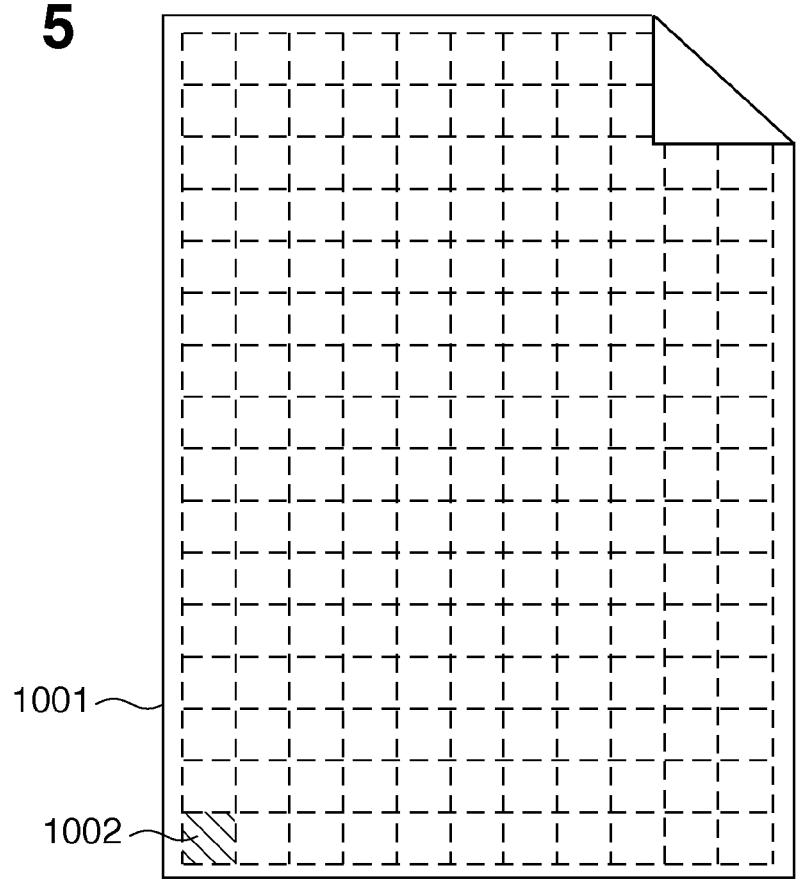
FIG. 5 is a view for explaining the relationship between image data and a visible image formed on a printing medium such as a paper sheet.

FIG. 5 is a view for explaining the relationship between divided image data (also referred to as tile images in this embodiment) and a visible image formed on a printing medium such as a paper sheet. As shown in FIG. 5, image data divided into small areas 1002 add up to form a visible image corresponding to a full sheet surface 1001.

Figure 6:
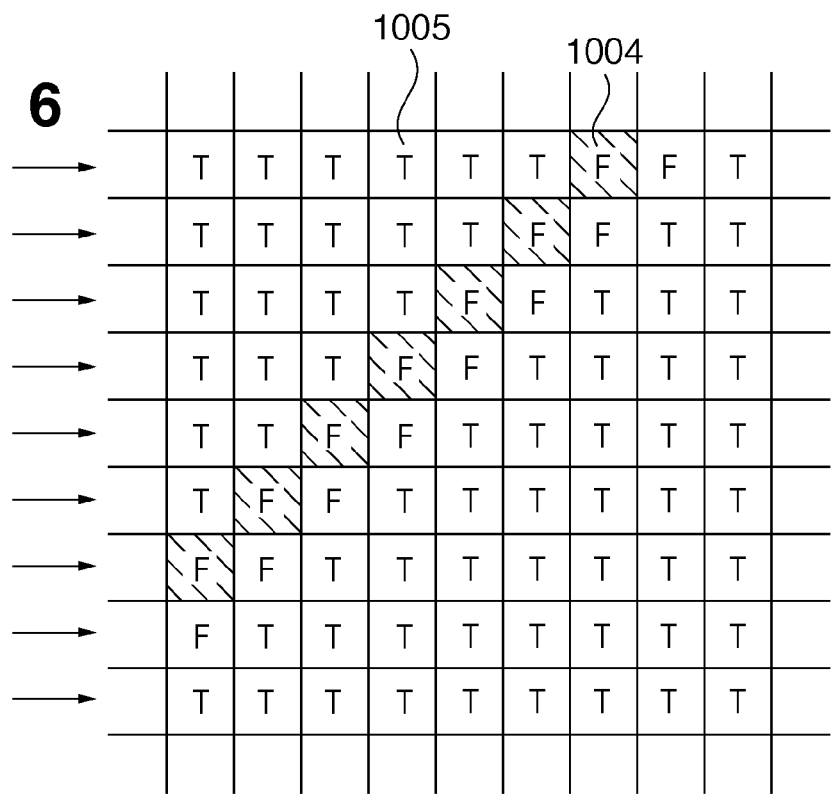
FIG. 6 is a view for explaining a repeat flag.

FIG. 6 is a view for explaining a repeat flag. Each small area shown in FIG. 6 indicates a tile image explained with reference to FIG. 5. In this embodiment, tile images are continuously generated in a predetermined direction, for example, from the upper line to the lower line and from the left to the right in each line, as indicated by arrows. In FIG. 6, a small area 1005 indicates a tile image filled with white color information, and a small area 1004 indicates a tile image filled with desired color information. "T" or "F" added to each small area represents a repeat flag that is the additional information of a tile image. In this embodiment, a repeat flag "T" represents that the visible image of a certain tile image has the same contents as those of the immediately precedingly generated tile image. A repeat flag "F" represents that the visible image of a certain tile image has contents different those of the immediately precedingly generated tile image.

Assume that the small area 1004 in FIG. 6 is a black line. In this case, the small area before (i.e., on the left side of) the small area 1004 is filled with white color information, and the small area 1004 is filled with black color information. Hence, the repeat flag of the small area 1004 is "F". The small area after (i.e., on the right side of) the small area 1004 is filled with white color information and therefore has contents different from those of the small area 1004. Hence, the repeat flag is "F".

This generally applies to a case in which, for example, the small area 1004 in FIG. 6 is a white line. Even when a white line is to be drawn on a sheet, the white color information of the small area 1005 and that of the small area 1004 are discriminated in the PDL data. Hence, as shown in FIG. 6, the repeat flag of the small area 1004 is "F". In this embodiment, however, even when the small area 1004 is a white line, the sheet surface can be determined as a blank sheet. The determination process will be described later. As shown in FIG. 6, this embodiment makes it possible to determine by the repeat flag whether tile images of the same contents are generated continuously within a certain range.

Referring back to FIG. 4, in step S108, the CPU 305 controls the RIP 3031, which sequentially outputs the generated tile images and additional information to the image processing unit 3032. In step S109, the image processing unit 3032 executes image processing based on the received tile image and additional information. In this embodiment, the image processing unit 3032 executes image processing such as editing image attribute information, color conversion based on image attribute information, determining whether the tile images received so far contain a chromatic color or achromatic color, and color space conversion. In step S110, the CPU 305 sequentially outputs, to the compression unit 3033, the tile images and additional information which have undergone the image processing. In step S111, the compression unit 3033 compresses the received tile images and part of the additional information. Part of additional information indicates, for example, image attribute information. The compression unit 3033 compresses the image attribute information together with the tile images, except flag data and the like contained in the additional information.

In step S112, the CPU 305 controls the compression unit 3033, which writes the compressed tile images and additional information in the RAM 306. The CPU 305 performs control by, for example, designating, to the compression unit 3033, address information of the RAM 306 where the compression unit 3033 should write the data. In step S113, the compression unit 3033 adds the data sizes of the compressed tile images and additional information, which are written in the RAM 306, to calculate a sum. The calculated sum can be read out in accordance with a request from the CPU 305.

After the tile images are processed in steps S108 to S113, it is determined in step S114 whether all tile images of the target DL have been processed, and the RIP process has finished. If it is determined that the RIP process has finished, the RIP 3031 sends information representing the finish to the CPU 305. On the other hand, if it is determined that the RIP process has not finished, steps S106 to S113 are repeated. In step S1000, the CPU 305 determines whether to acquire a visible image in a blank sheet determination process, that is, an image forming process according to the embodiment to be described later.

Figure 7:
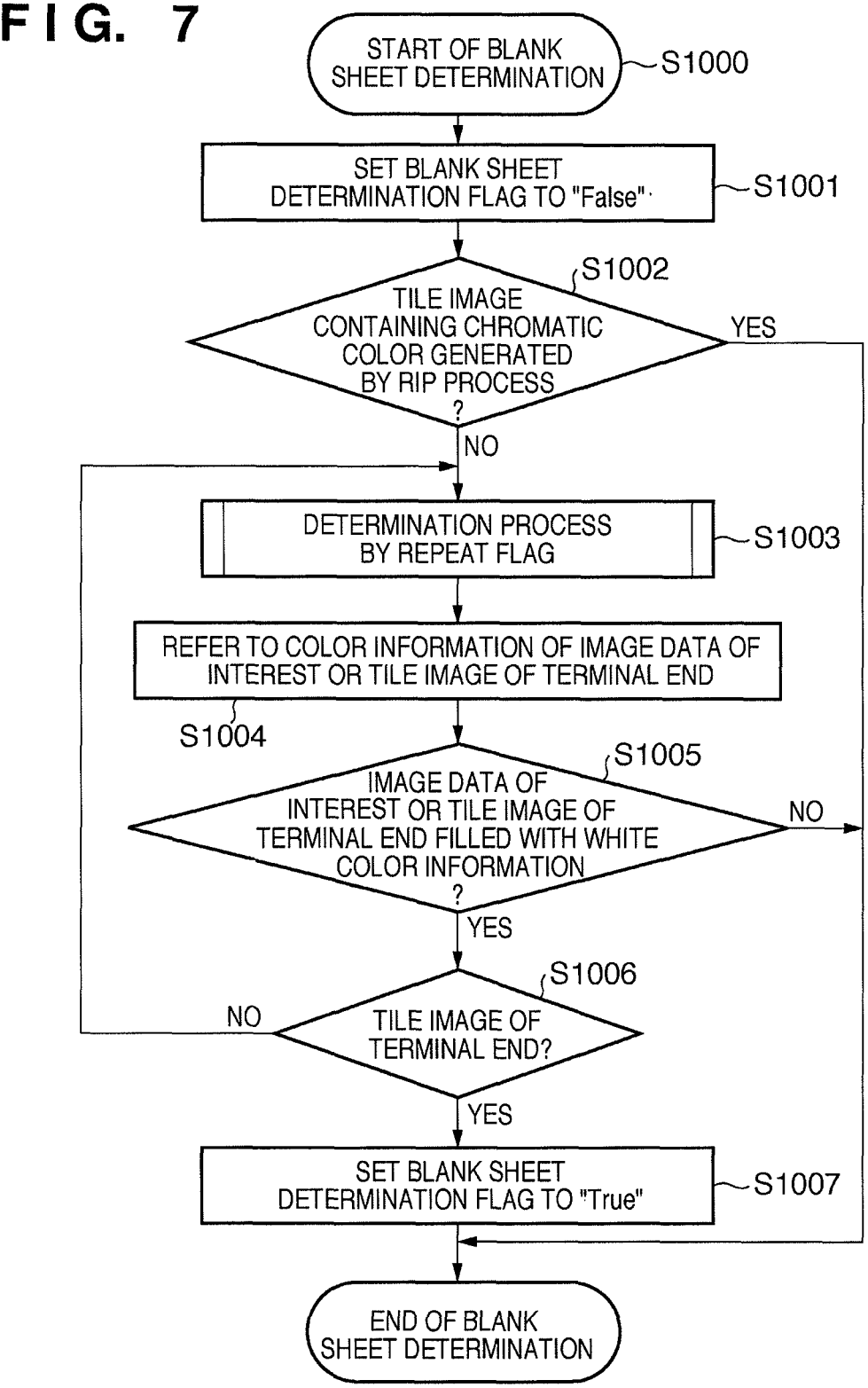
FIG. 7 is a flowchart illustrating the procedure of a blank sheet determination process according to the first embodiment.

FIG. 7 is a flowchart illustrating the procedure of a blank sheet determination process according to the first embodiment. In the blank sheet determination process in FIG. 7, whether to acquire a visible image in an image forming process is determined. As already described, the blank sheet determination process is performed after the RIP process, as shown in FIG. 4.

In step S1001, the CPU 305 sets a blank sheet determination flag variable to the initial value "False". The blank sheet determination flag variable is a variable stored in a storage area of, for example, the RAM 306. The CPU 305 can execute blank sheet determination by referring to the state of the variable. "False" indicates a negative numerical value and is expressed as a predetermined numerical value such as "0" or "1". "False" represents that an image "is not a blank sheet" in the blank sheet determination process and that a kind of visible image will be obtained in the image forming process. To the contrary, "True" indicates a positive numerical value and is similarly expressed as a predetermined numerical value. "True" represents that an image "is a blank sheet" in the blank sheet determination process and that no visible image will be obtained in the image forming process.

In step S1002, the CPU 305 determines whether the image processing unit 3032 has generated at least one tile image containing a chromatic color (an example of a second determination unit). That is, the CPU determines in step S1002 whether an image is color or monochrome. If it is determined that no tile image containing a chromatic color is generated, the process advances to step S1003. If it is determined that at least tile image containing a chromatic color is generated, the CPU 305 finishes the blank sheet determination process. In finishing the blank sheet determination process, the CPU 305 can determine that the image data obtained by the RIP process is not a blank sheet because the blank sheet determination flag is "False". That is, the CPU can determine that a kind of visible image will be formed on a medium such as a paper sheet.

In step S1003, the CPU 305 reads out the repeat flag of each tile image on the sheet surface 1001. As already described, a repeat flag is contained in the additional information of a tile image.

Figure 8:
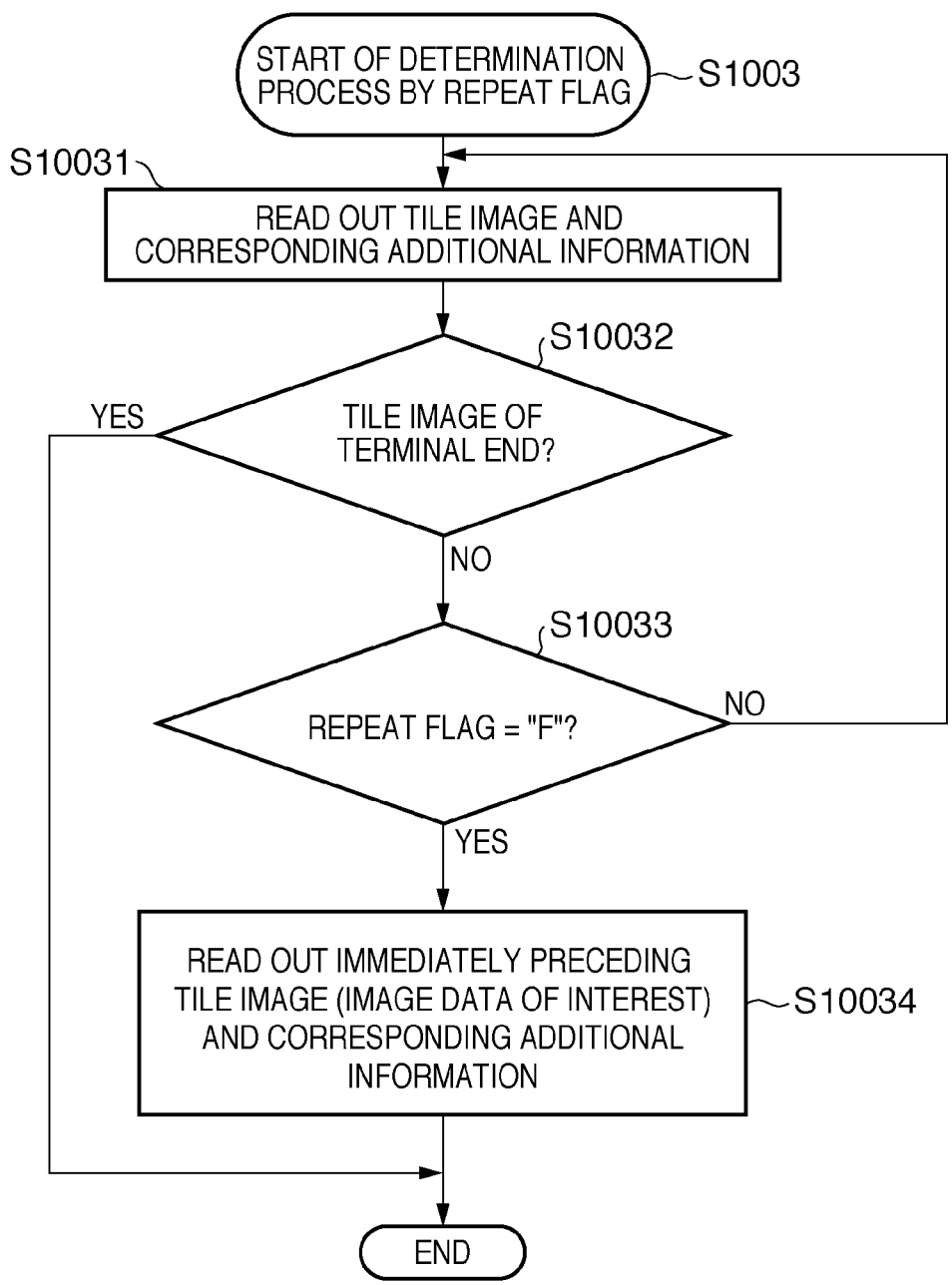
FIG. 8 is a flowchart illustrating the procedure of a determination process by a repeat flag shown in FIG. 6.

The process in step S1003 will be described here with reference to FIG. 8. First, in step S10031, the CPU 305 reads out a tile image and the repeat flag in corresponding additional information. In step S10032, the CPU 305 determines whether the readout tile image is that of the terminal end of the sheet surface 1001. More specifically, the CPU determines whether the tile image is the last one of the tile images which are sequentially generated to obtain a visible image to be formed on a medium such as a paper sheet. If it is determined that the tile image is not that of the terminal end, the process advances to step S10033. The CPU 305 determines whether the repeat flag contained in the additional information is "T" or "F". If it is determined in step S10032 that the tile image is that of the terminal end, the CPU 305 advances to step S1004 in FIG. 7.

If the repeat flag is "F" in step S10033, the process advances to step S10034. In step S10034, the CPU 305 reads out an immediately precedingly generated tile image and corresponding additional information. Then, the process advances to step S1004 in FIG. 7. The immediately precedingly generated tile image specified (an example of a specifying unit of this embodiment) in step S10034 will also be referred to as image data of interest hereinafter. If the repeat flag is "T", the process returns to step S10031. The CPU 305 reads out a succeedingly generated tile image and the repeat flag in corresponding additional information. In this embodiment, the continuous range of tile images is detected (an example of a detection unit of this embodiment). The tile image and additional information of image data of interest within the continuous range, or the tile image of the terminal end and its additional information are read out. Then, the process advances to step S1004.

Referring back to FIG. 7, in step S1004, the CPU 305 refers to the color information of the readout tile image. In step S1005, the CPU determines whether the tile image is filled with white color information (an example of a first determination unit of this embodiment). That is, in this embodiment, the color information of the immediately preceding tile image of the tile image having the repeat flag "F", or the tile image of the terminal end is determined. If it is determined that the tile image is filled with white color information, the process advances to step S1006. On the other hand, if it is determined that the tile image is not filled with white color information, that is, the tile image contains color information except white for one or more pixels, the CPU 305 finishes the blank sheet determination process. When it is determined in step S1005 that the tile image is not filled with white color information, the blank sheet determination flag is "False". Hence, the CPU 305 can determine that the image data obtained by the RIP process is not a blank sheet. That is, the CPU can determine that a kind of visible image will be obtained by image formation on a medium such as a paper sheet.

When it is determined in step S1005 that all pixels of the image data of interest are filled with white color information, the CPU can determine that all the tile images continuously having the repeat flag "T" are filled with white color information.

In step S1006, the CPU 305 determines whether the referred tile image is that of the terminal end. More specifically, the CPU determines whether the tile image is the last one of the tile images which are sequentially generated to obtain a visible image on a medium such as a paper sheet.

If the CPU determines that the tile image is the finally generated tile image one, the process advances to step S1007. The CPU 305 changes the blank sheet determination flag to "True" and finishes the blank sheet determination process. As a result, the CPU 305 can determine that the image data obtained by the RIP process is a blank sheet. That is, the CPU can determine that no visible image will be formed by image formation on a medium such as a paper sheet. On the other hand, if it is determined in step S1006 that the tile image is not that of the terminal end, the process returns to step S1003 to determine again whether tile images within the continuous range of repeat flag "T" are filled with white. More specifically, it is determined, in each continuous range where image data continue on the sheet surface 1001, whether image data of interest is filled with white color information. If it is determined in all ranges on the sheet surface 1001 that image data of interest is filled with white color information, the sheet surface 1001 is determined as a blank sheet.

Figure 9:
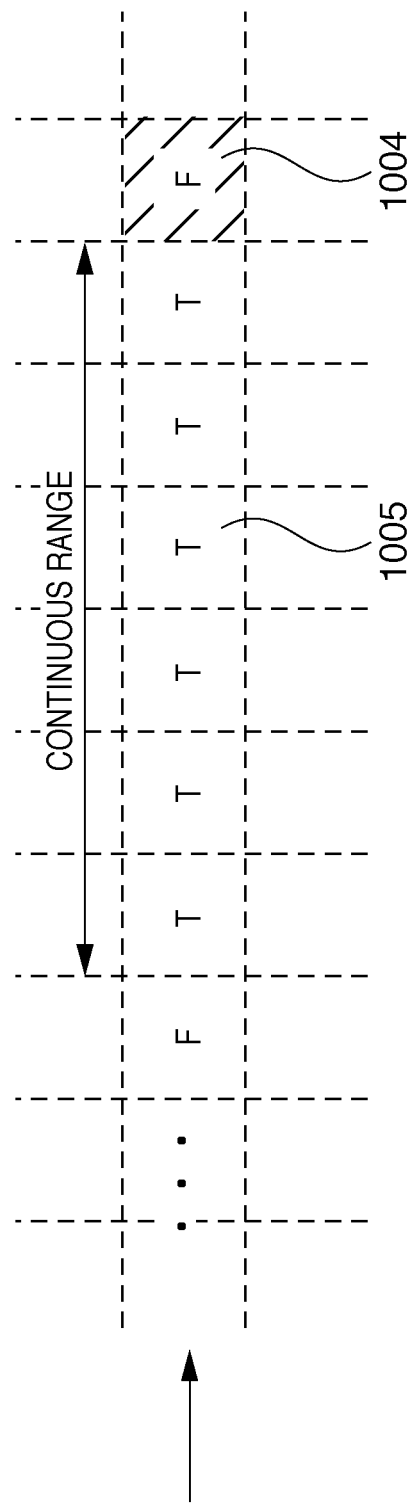
FIG. 9 is a view for explaining the concept of the blank sheet determination process according to the embodiment.

FIG. 9 is a view for explaining the concept of the blank sheet determination process described with reference to FIGS. 7 and 8. Referring to FIG. 9, the tile images are generated sequentially from the left to the right in each line, as indicated by an arrow. As shown in FIG. 9, a "continuous range" is determined by the repeat flag to contain tile images which have the same contents and are adjacent to each other. That is, if one of the tile images in the "continuous range" is determined to be filled with white color information, all the tile images within the "continuous range" can be determined to be filled with white color information.

In this embodiment, it is determined whether the immediately preceding tile image of a tile image having the repeat flag "F", that is, the last one (the tile image on the left side of the small area 1004) of continuous tile images having the same contents is filled with white color information. Of the continuous tile images having the same contents, a tile image except the finally generated tile image may be defined as image data of interest, and whether it is filled with white color information may be determined. The image data generated by the RIP process may be divided not into tile-shaped small areas as shown in FIG. 5, 6, or 9 but into small areas in another shape.

As described above, according to this embodiment, after determining whether image data is color or monochrome, it is repeatedly determined whether image data of interest is filled with white in each continuous range of repeat flag "T" of tile images sequentially generated to form a visible image on a medium such as a paper sheet. Hence, if it is determined that the color information of image data of interest is filled with white in all continuous ranges of repeat flag "T", it is determined that no visible image will be formed by image formation on a medium such as a paper sheet. In this embodiment, the color information of tile information needs to be referred to only once in the range of repeat flag "T". This makes it possible to speed up the blank sheet determination process without adding hardware. Additionally, color determination of image data of interest is performed in all of a plurality of continuous ranges existing on the sheet surface, as shown in FIGS. 7 and 8. It is therefore possible to prevent any determination error that blank sheet determination fails due to information representing that "drawing of a white line or the like is present" in blank sheet determination.

Figure 10:
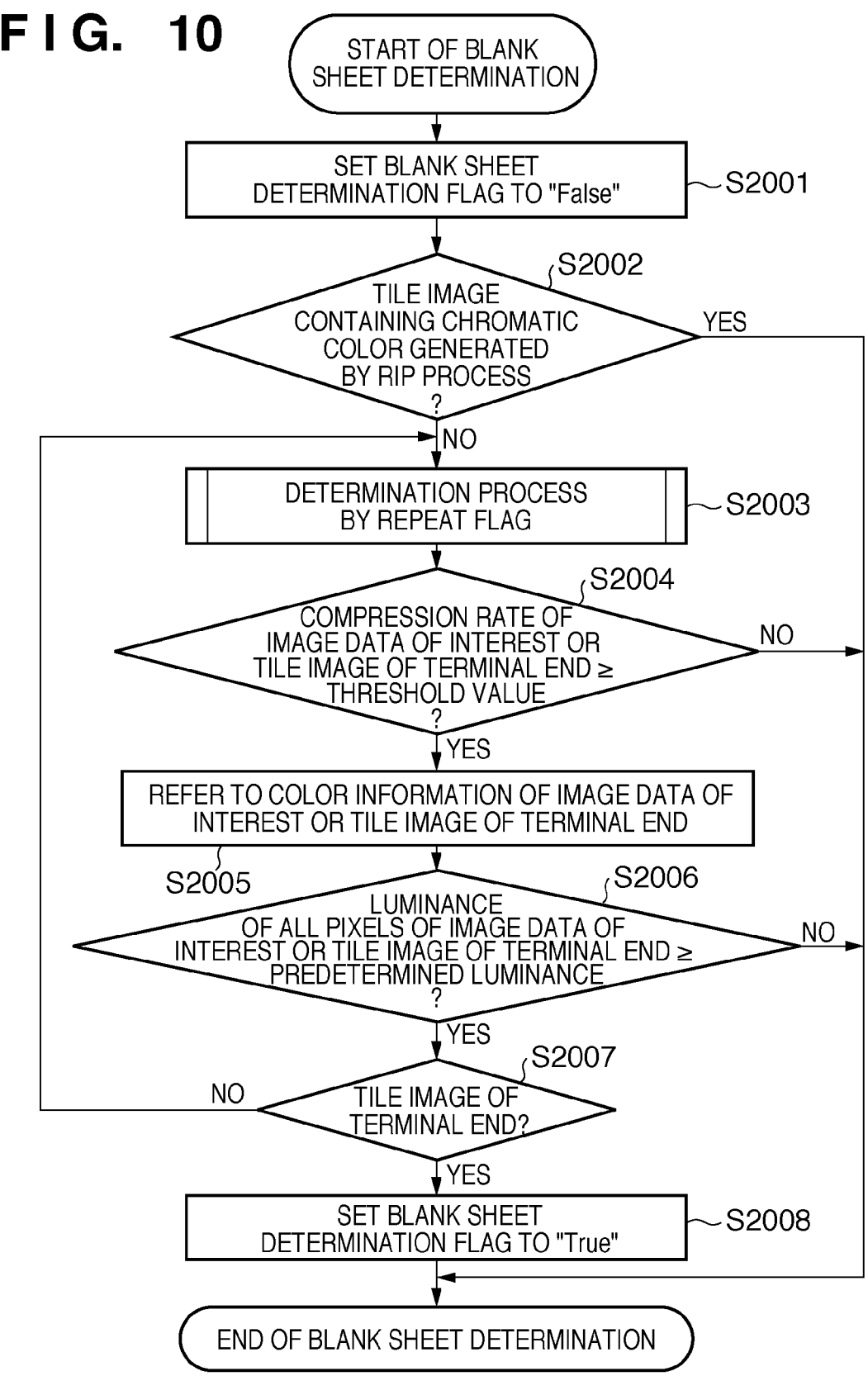
FIG. 10 is a flowchart illustrating the procedure of a blank sheet determination process according to the second embodiment.

FIG. 10 is a flowchart illustrating the procedure of a blank sheet determination process according to the second embodiment. In the first embodiment, it is determined that the color information of one tile image (image data of interest) is filled with white in a continuous range of repeat flag "T", and it is then determined that no visible image will be formed by an image formation process on a medium such as a paper sheet. In the second embodiment, even when color information a human can rarely identify is contained, blank sheet determination can be done at a high speed.

The flowchart in FIG. 10 is performed in the blank sheet determination process (step S1000) shown in FIG. 4, as in the first embodiment. The process in steps S2001 to S2003 is the same as in steps S1001 to S1003 of FIG. 7.

In this embodiment, a CPU 305 determines in step S2004 whether the compression rate of the tile image obtained in step S2003 is equal to or more than a threshold value (an example of a third determination unit). In this embodiment, the compression rate is obtained by $$\kappa = 1 - \frac{\Omega}{\text{size} \times \text{channel} \times \text{depth}} \quad (1)$$

where "κ" is the compression rate, "size" is the number of pixels of the tile image, "channel" is the number of elements of the color space of the tile image, "depth" is the bit depth of the tile image, and "Ω" is the size of the compressed tile image. The number of elements of the color space is the number of elements necessary for expressing a color in the color space. That is, the number of elements is the number of elements of a vector representing the color space and is equal to the number of bases. For example, the number of elements of the RGB space is three. The number of elements of the CMYK space is four. The bit depth represents the number of quantization bits of one pixel in one color space.

If the CPU determines in step S2004 that the compression rate of the tile image is equal to or more than the threshold value, the process advances to step S2005. The CPU 305 refers to the color information of the image data of interest or the tile image of the terminal end. To determine whether the tile image is filled with white color information, the compressed tile image is decompressed and analyzed to check the color information. If the CPU determines in step S2004 that the compression rate of the tile image is less than the threshold value, the blank sheet determination process is ended.

When it is determined that the compression rate of the tile image is less than the threshold value, the blank sheet determination flag is "False". Hence, the CPU 305 can determine that the image data obtained by the RIP process is not a blank sheet. That is, the CPU can determine that a kind of visible image will be obtained by image formation on a medium such as a paper sheet.

The process executed upon determining that the compression rate of the tile image is equal to or more than the threshold value will be described. Generally, the size of compressed image data decreases as the rendering information of the compression target becomes more repetitious. For example, when completely white image data is compressed, its size becomes smaller than that of image data containing a kind of visible image.

Figure 11:
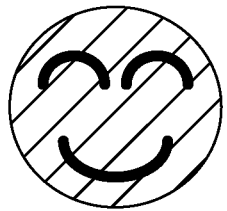
FIG. 11 is a view for explaining the relationship between compression rates and image contents.

FIG. 11 is a view showing the relationship between compression sizes and image contents. FIG. 11 shows the sizes of images which have the same number of pixels and different contents and are compressed by the same compression method. As shown in FIG. 11, the size of the image filled with white color information is smallest. That is, the compression rate is highest. It is therefore possible to discriminate between a repetitious rendering image and a non-repetitious rendering image by the compression rate. The used compression algorithm and the parameters given to it, that is, the parameters used in equation (1) have correlation with the size of the compressed image.

The determination process in step S2004 of FIG. 10 is not executed by scanning all pixels of the tile image of the determination target, as in the first embodiment. For example, as described in association with step S10034 in FIG. 8, the determination is done for an immediately precedingly generated tile image (image data of interest). Additionally, the determination in step S2004 is not necessarily done for a tile image filled with white color information, as shown in FIG. 11.

In step S2005, the CPU 305 refers to the color information of the image data of interest or the tile image of the terminal end. In step S2006, the CPU 305 determines whether the pieces of color information of all pixels of the referred image data of interest or the tile image of the terminal end have a predetermined luminance or more (an example of a first determination unit of this embodiment). The luminance is obtained by the following equation based on a standard generally defined by "NTSC".

When the input color space is RGB, the luminance is obtained by $$B = 1.0 - 0.3 \times \text{red} + 0.59 \times \text{green} + 0.11 \times \text{blue} \quad (2)$$

where "B" is the luminance which takes a value from 0 (inclusive) to 1 (exclusive), "red" is the luminance of red which takes a value from 0 (inclusive) to 1 (exclusive), "green" is the luminance of green which takes a value from 0 (inclusive) to 1 (exclusive), and "blue" is the luminance of blue which takes a value from 0 (inclusive) to 1 (exclusive).

When the input space is CMYK, the luminance is obtained by $$B = \min(1.0, 0.3 \times \text{cyan} + 0.59 \times \text{magenta} + 0.11 \times \text{yellow}) + \text{black} \quad (3)$$

where "B" is the luminance which takes a value from 0 (inclusive) to 1 (exclusive), "cyan" is the luminance of cyan which takes a value from 0 (inclusive) to 1 (exclusive), "magenta" is the luminance of magenta which takes a value from 0 (inclusive) to 1 (exclusive), and "yellow" is the luminance of yellow which takes a value from 0 (inclusive) to 1 (exclusive).

If the CPU determines that the pieces of color information of all pixels of the tile image have the predetermined luminance or more, the process advances to step S2007. If the CPU determines that the pieces of color information of not all pixels of the tile image have the predetermined luminance or more, that is, if the CPU determines that one or more pixels include color information less than the predetermined luminance, the process is ended. If it is determined that the pieces of color information of not all pixels of the tile image have the predetermined luminance or more, the CPU 305 can determine that the image data obtained by the RIP process is not a blank sheet because the blank sheet determination flag is "False". That is, the CPU can determine that a kind of visible image will be obtained by image formation on a medium such as a paper sheet. If it is determined in step S2006 that the pieces of color information of all pixels of the tile image have the predetermined luminance or more, the CPU can determine that all the tile images within the continuous range of repeat flag "T" have the predetermined luminance or more.

In step S2007, the CPU 305 determines whether the referred tile image is that of the terminal end. If the CPU determines that the tile image is that of the terminal end, the CPU 305 changes the blank sheet determination flag to "True" in step S2008 and finishes the blank sheet determination process. In this case, the CPU 305 can determine that the image data obtained by the RIP process is a blank sheet, as in the first embodiment. That is, the CPU can determine that no visible image will be formed by image formation on a medium such as a paper sheet, or that color information a human can rarely identify is contained. On the other hand, if it is determined in step S2007 that the tile image is not that of the terminal end, the process returns to step S2003.

In this embodiment, it may be determined whether all pixels have a predetermined luminance or more, not for the finally generated one of tile images in the continuous range but for a certain tile image, as in the first embodiment. In addition, the image data generated by the RIP process may be divided not into tile-shaped small areas but into small areas in another shape.

As described above, according to this embodiment, it is repeatedly determined whether all pixels of image data of interest have a predetermined luminance or more in each continuous range of repeat flag "T" of tile images sequentially generated to obtain a visible image on a medium such as a paper sheet up to the finally generated tile image. If it is determined that the pieces of color information of all pixels of the image data of interest within the continuous range have the predetermined luminance or more, it can be determined that no visible image will be formed by image formation on a medium such as a paper sheet, or that color information a human can rarely identify is contained.

In this embodiment, if it is determined that a range in which the compression rate is less than the threshold value exists by determining whether the compression rate of image data of interest in the continuous range of repeat flag "T" is equal to or more than the threshold value, the image data is determined not to be a blank sheet, and the process is ended. Since the luminance determination in step S2006 is not performed for a continuous range where the compression rate is less than the threshold value, the blank sheet determination process can be speeded up.

Figure 12:
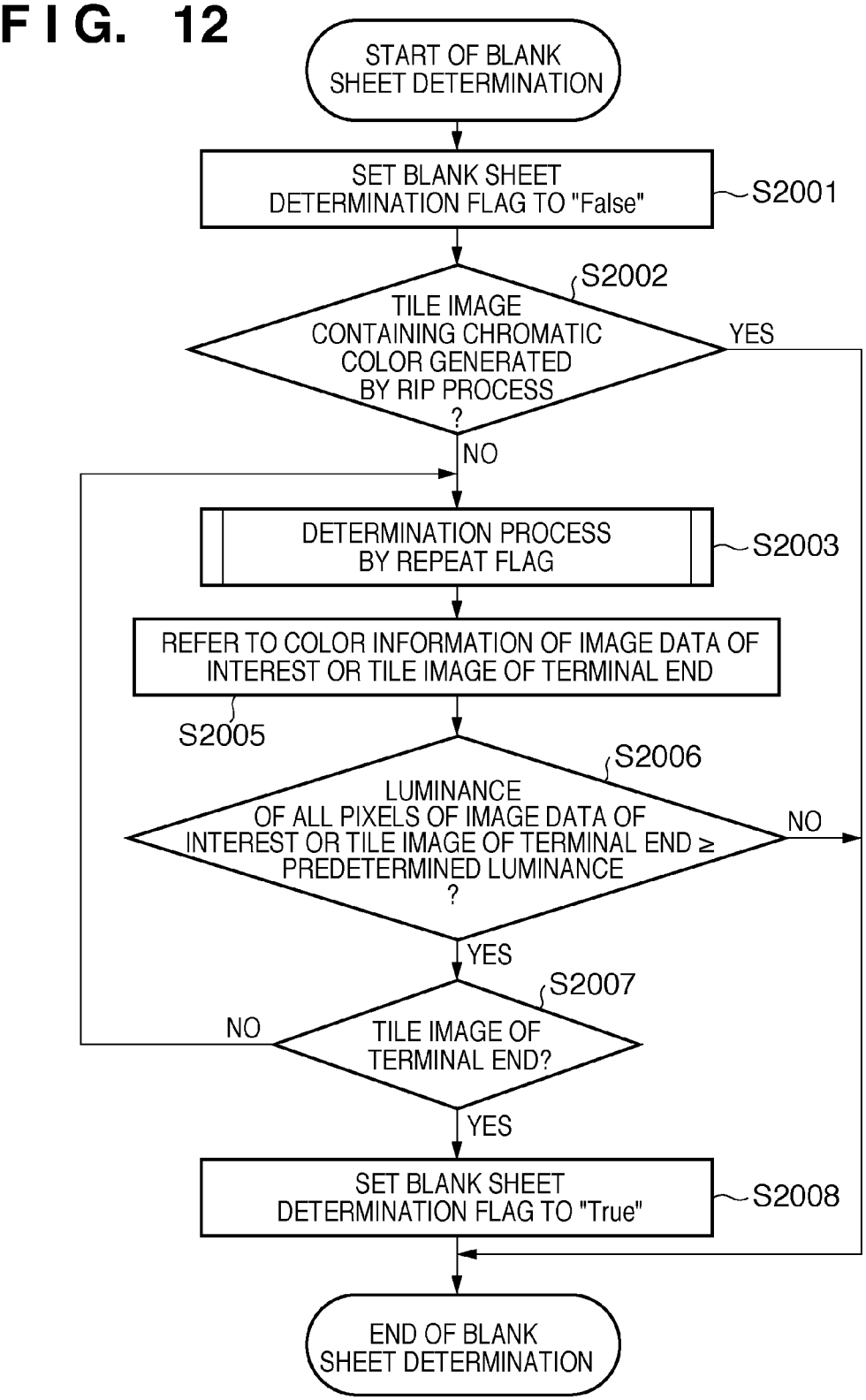
FIG. 12 is a flowchart illustrating the procedure of a blank sheet determination process according to the third embodiment.

FIG. 12 is a flowchart illustrating the procedure of a blank sheet determination process according to the third embodiment. The flowchart in FIG. 12 does not include the determination process of comparing the compression rate of a tile image with a threshold value, unlike the second embodiment. In the third embodiment, it is determined, by the luminance of one tile image in the continuous range of repeat flag "T", that an image is to be formed on a medium such as a paper sheet, or that color information a human can rarely identify is contained. It is therefore possible to execute the blank sheet determination process without calculating the sum after tile image compression.

The present invention also incorporates a case in which the functions of the above-described embodiments are implemented by causing the operating system (OS) running on a computer to partially or wholly execute actual processing based on the instructions of program codes. The present invention is also applicable to a case in which program codes read out from a storage medium are written in the memory of a function expansion card inserted to the computer or a function expansion unit connected to the computer. In this case, the CPU of the function expansion card or function expansion unit partially or wholly executes actual processing based on the instructions of the program codes, thereby implementing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-233382, filed Sep. 7, 2007, which is hereby incorporated by reference herein in its entirety.

What is claimed is:

1. An image forming apparatus for generating tile images which correspond respectively to small areas into which a page is divided and forming an image based on the tile images, comprising:
   a detection unit configured to detect in the page, a range comprising consecutive tile images which have identical image contents based on flags each indicating that an image content of a tile image is identical to an image content of a preceding tile image;
   a referring unit configured to refer to color information of an end tile image which is generated at an end portion of the consecutive tile images of the range detected by the detection unit and to not refer to color information of other tile images of the consecutive tile images of the range detected by the detection unit; and
   a first determination unit configured to determine, in a case where the referred to color information, which is referred to by the referring unit, of the end tile image in each range detected by the detection unit indicates white, that the information of the other tile images of the consecutive tile images in each range detected by the detection unit indicate white and determine that the page is blank.

2. The apparatus according to claim 1, further comprising:
   a second determination unit configured to determine whether a tile image containing a chromatic color exists,
   wherein in a case where the second determination unit determines that the tile image containing the chromatic color does not exist, the detection unit detects the range.

3. The apparatus according to claim 1, wherein
   a tile image has flag data of the flag representing whether the tile image has image content identical to an immediately preceding tile image, and
   the detection unit detects the range by referring to the flag data.

4. The apparatus according to claim 1, wherein the end tile image is generated when the end portion of the consecutive tile images of the range is detected by the detection unit.

5. The apparatus according to claim 1, wherein the first determination unit determines that the page is blank in a case where the end tile image is filled with white pixels in each range detected by the detection unit in the page.

6. The apparatus according to claim 1, wherein the first determination unit determines that the page is a blank sheet when all pixels contained in end tile image has not less than a predetermined luminance in all continuous ranges of the image data included in the page.

7. The apparatus according to claim 1, further comprising:
a compression unit configured to compress the tile images; and
a third determination unit configured to determine whether a compression rate used by the compression unit to compress the end tile image referred to by the referring unit is not less than a predetermined threshold value,
wherein if the third determination unit determines that the compression rate is not less than the predetermined threshold value, the first determination unit determines whether the page is a blank sheet.

8. An image forming method of generating tile images which correspond respectively to small areas in which a page is divided and forming an image based on the tile images, comprising:
a detection step of detecting, in the page, a range comprising consecutive tile images which have identical image contents based on flags each indicating that an image content of a tile image is identical to an image content of a preceding tile image;
a referring step of referring to color information of an end tile image which is generated at an end portion of the consecutive tile images of the range detected by the detection step and not referring to color information of other tile images of the consecutive tile images of the range detected by the detection step; and
a first determination step of determining, in a case where the referred to color information, which is referred by the referring step, of the end tile image in each range detected by the detection step indicates white, that the information of the other tile images of the consecutive tile images in each range detected by the detection step indicate white and determining that the page is blank.

9. A non-transitory computer-readable medium which stores an executable program for executing an image forming method of generating tile images which correspond respectively to small areas in which a page is divided and forming an image based on the tile images, the method comprising:
a detection step of detecting, in the page, a range comprising a consecutive tile images which have identical image contents based on flags each indicating that an image content of a tile image is identical to an image content of a preceding tile image;
a referring step of referring to color information of an end tile image which is generated at an end portion of the consecutive tile images of the range detected by the detection step and not referring to color information of other tile images of the consecutive tile images of the range detected by the detection step; and
a first determination step of determining, in a case where the referred to color information, which is referred by the referring step, of the end tile image in each range detected by the detection step indicates white, that the information of the other tile images of the consecutive tile images in each range detected by the detection step indicate white and determining that the page is blank.

* * * * *